(12) United States Patent
Leung

(10) Patent No.: US 8,728,421 B2
(45) Date of Patent: May 20, 2014

(54) METHOD FOR THE TREATMENT OF EXHAUST GAS PRODUCED BY HIGH-TEMPERATURE WASTE INCINERATOR WITH A DUAL-PURPOSE REACTOR AND THE SYSTEM THEREOF

(75) Inventor: Ching Chiu Leung, Hong Kong (CN)

(73) Assignee: Satarem Technologies Limited, Central Hong Kong (CN)

( * ) Notice: Subject to any disclaimer, the term of this patent is extended or adjusted under 35 U.S.C. 154(b) by 0 days.

(21) Appl. No.: 13/977,218

(22) PCT Filed: Dec. 26, 2011

(86) PCT No.: PCT/CN2011/084693
§ 371 (c)(1),
(2), (4) Date: Jun. 28, 2013

(87) PCT Pub. No.: WO2012/089089
PCT Pub. Date: Jul. 5, 2012

(65) Prior Publication Data
US 2013/0272941 A1    Oct. 17, 2013

(30) Foreign Application Priority Data
Dec. 30, 2010    (CN) .......................... 2010 1 0612187

(51) Int. Cl.
| | | |
|---|---|---|
| *B01D 53/34* | (2006.01) | |
| *B01D 53/72* | (2006.01) | |
| *B01D 53/74* | (2006.01) | |
| *F23J 11/00* | (2006.01) | |
| B01D 53/40 | (2006.01) | |
| B01D 53/44 | (2006.01) | |
| B01D 53/81 | (2006.01) | |
| B01D 53/86 | (2006.01) | |
| F23J 15/02 | (2006.01) | |

(52) U.S. Cl.
CPC .............. *B01D 53/34* (2013.01); *B01D 53/346* (2013.01); *B01D 53/40* (2013.01); *B01D 53/44* (2013.01); *B01D 53/72* (2013.01); *B01D 53/74* (2013.01); *B01D 53/81* (2013.01); *B01D 53/8681* (2013.01); *B01D 53/8687* (2013.01); *F23J 15/02* (2013.01); *Y10S 423/06* (2013.01)
USPC .................. 423/210; 423/245.3; 423/DIG. 6; 422/168; 422/177; 110/345

(58) Field of Classification Search
CPC ...... B01D 53/34; B01D 53/346; B01D 53/40; B01D 53/44; B01D 53/72; B01D 53/74; B01D 53/81; B01D 53/8681; B01D 53/8687
See application file for complete search history.

(56) References Cited

U.S. PATENT DOCUMENTS 5,607,654 A * 3/1997 Lerner ....................... 423/240 S

FOREIGN PATENT DOCUMENTS

| CN | 1778752 | 5/2006 |
| CN | 1780799 | 5/2006 |
| CN | 101761928 | 6/2010 |
| CN | 101776269 | 7/2010 |

* cited by examiner

*Primary Examiner* — Timothy Vanoy
(74) *Attorney, Agent, or Firm* — Cesari and McKenna, LLP

(57) ABSTRACT

The present invention relates to environmental protection field. The present invention provided a method and a system thereof for treating flue gases generated from waste incinerator by using a dual-purpose reactor, wherein said dual-purpose reactor includes a connected incineration chamber and gas-solid suspension chamber. The method and the system of the invention can continuous operate under high temperature and remove acid gases and dioxin or dioxin precursor completely.

13 Claims, 2 Drawing Sheets

METHOD FOR THE TREATMENT OF EXHAUST GAS PRODUCED BY HIGH-TEMPERATURE WASTE INCINERATOR WITH A DUAL-PURPOSE REACTOR AND THE SYSTEM THEREOF

CROSS REFERENCE TO RELATED APPLICATION

This application is a national stage application, filed under 35 U.S.C. §371, of PCT Application No. PCT/CN2011/084693, filed on Dec. 26, 2011, entitled "METHOD USING DUAL PROCESS REACTOR FOR PROCESSING FLUE GAS FROM HIGH TEMPERATURE WASTE INCINERATOR, AND SYSTEM THEREOF", which claimed priority to Chinese Application No. 201010612187.2, filed on Dec. 30, 2010, all of which are hereby incorporated by reference in their entirety.

FIELD OF THE INVENTION

The present invention relates to a technology field of environmental protection of wastes combustion process by using a dual purposes reactor, especially relates to a method for resolving harmful acid gases and other noxious substance generated from wastes combustion process and achieving energy recycling.

BACKGROUND OF THE INVENTION

With high development of economy, municipal solid wastes (MSW) are increasing quickly, especially industry hazardous wastes, medical wastes etc., which, if were not properly handled, will become a big direct threaten to human life. During recent years, MSW were increasing largely, at an annual growth rate of 8%, and until now in China, wastes amounts are over 150 million tons. Therefore, how to treat such a mass of wastes has been paid attention more and more. Presently, waste combustion method is the most effective method to solve wastes problem. Incineration method can alleviate pressure of MSW disposal and plough, but, at the mean time, many problems occasioned. Such as acid gases in exhaust ash may bring high or low temperature erosion to heat transfer surface and flue. In addition, dioxin in flue gases, which is noxious and carcinogenic, if are not properly treated, serious secondary pollution will be triggered.

Waste incinerator has been widely used in waste combustion system. However, toxic substances in flue gases generated from waste combustion process are increased accordingly, especially toxic gases from combustion of medical wastes, industry wastes et cetera. Meanwhile, since waste gas emission standard is very strict all over the world, which will be stricter in the future, so higher requests for flue gases purification technology are needed. Strict emission standard often greatly enlarges invest and operation cost of purification system.

Majority pollutants from incinerator are variation of acid gases, chlorides, $SO_2$, CO, heavy metals, dust, dioxin and so on, furthermore tar content in these exhaust gas is rather high. And the existing status of these pollutants including gaseous, liquid and solid forms. Some of the polluters can be decreased by incineration process upgrade. But most are to be improved in the flue gases purification technology and system process design.

Polluters contained in the flue ash are as below:

| Pollutant | Amount (mg/Nm³) |
|---|---|
| Dust | 1000-20000 |
| HCl | 100-3300 |
| $SO_X$ | 200-3900 |
| HF | 5.8 |
| NOX | 750 |
| Hg | 0.2-5.0 |
| CO | 300 |
| Other Heavy Mentals | 5-30 |
| Total Organics | 200-2000 |

It can be seen that flue ash from incinerator contains large quantities of harmful gases. The kinds of polluter gases are greatly depended on waste content and auxiliary fuel. So there are many limited items for incinerator flow ash emission domestic and foreign, and the emission criterion is stricter than industry. As the late start step of incineration technology and lag in flue ash purification technology in our country, usually easy to lead to second pollution. There are still many problems in the present application.

At present, all technology and patent already existed cannot solve the difficulties flue ash purification technology faced. Many of the technology dispelling acid gas and dioxin adopt shock chilling, alkali spraying or phase carbon absorption system. But they have the disadvantage of high cost, complex dispose equipment, non-complete dispose and serious second pollution. CN101178181 adopts shock chilling to make temperature of flow ash low to 155~188° C. from high degree in seconds, then use alkali spraying technology. This method leads to high waste of energy, big consumption of water and enlarge the disposal cost. CN101099921 use carbon absorption system to absorb dioxin. But by this way it cannot stop the formation of dioxin radically and disposal cost are extremely high. Hydro-thermal treatment is applied to disposal incineration ash in CN101050862, in which dioxin and other harmful gas can be eliminated, however, it generates waste water and waste water treatment have to be added. As a result, large water resource will be cost.

Therefore, in this field, a method and related system is urgently needed which could eliminate the environment pollution brought by waste incineration especially pollution brought by the flue ash from incinerator process progress. The system is also needed to completely dispose all the harmful acid gas, dioxin and dioxin precursors.

SUMMARY OF THE INVENTION

This invention provided a method for treating flue gases (may also refer to "flue gas" or "flue ash" in the present invention) generated from waste incinerator by using a dual-purpose reactor, wherein said dual-purpose reactor includes a connected incineration chamber and gas-solid suspension chamber, which includes the following steps:
 (1) Monitoring temperature of flue gases generated from a waste incinerator to keep it at a high temperature, wherein said high temperature is 850~950° C., if the temperature is higher than the upper limitation of said high temperature, then cooling the flue gases and reduce the temperature to close to the upper limitation of said high temperature;
 (2) Introducing said flue gases into the incineration chamber of said dual-purpose reactor;
 (3) Introducing alkaline materials into said incineration chamber;

(4) Under the condition of maintaining said high temperature, the gas powder mixture of said flue gases and alkaline materials are introduced into the gas-solid suspension chamber of said dual-purpose reactor, in which the flue gases and alkaline materials are fully mixed and reacted, acid gases and dioxin precursor are removed;

(5) Said gas powder mixture is introduced into a high temperature filter, where gases and solids are separated from each other, and gases are drawn into heat energy recycle and dedusting system, finally are released into the atmosphere by a separated stack.

(6) Un-reacted alkaline materials are transferred to the incineration chamber for re-usage or collected in an ashes storage bin.

In one aspect of the invention, in step (1), in case that the temperature of flue gas in incinerator is higher than the upper limitation of said high temperature, temperature reduction measure are taken by means of an automatic cold air valve.

In one aspect of the invention, said high temperature in step (1) to (4) is 850 to 920° C., preferably 860 to 890° C.

The alkaline materials used in the present invention can be the commonly alkaline materials used in the flue ash treatment field. In one aspect of the invention, said alkaline material is selected from, such as lime (including quicklime and hydrated lime), limestone, silicon sands, alumina, clay or combination thereof In the present invention, said alkaline materials can be used in solid form. Limestone is made up of calcium carbonate ($CaCO_3$). Lime can be classified into quicklime and hydrated lime. The main content of quicklime is calcium oxide (CaO). Hydrated lime is made up by calcium hydroxide ($Ca(OH)_2$). After blend, hydrated lime can be made into lime slurry, lime putty or lime mortar etc. Clay, a kind of mineral material, contains several kinds of silicate and a specific volume of alumina ($Al_2O_3$), alkali metal oxides and alkaline earth metals oxides. And there are also some impurities like quartz, feldspar, mica, sulfate, sulfide and carbonate etc. The clay with high volume of silicon is more suitable for flue ash disposal.

In another aspect of the invention, the incineration reaction chamber of dual-purposes reactor has a fuel nozzle, through which fuel goes into incineration reaction chamber and burring to keep the high temperature in chamber. The preferable nozzle is a combined type, which can act as the nozzle for introducing not only fuel but also the alkali material.

In another aspect of the invention, in step (4) of the aforementioned method, enough urea, ammonia or the other reductant (deoxidizer) will be added into said gas-solid suspend chamber of the dual-purposes reactor to reduce the nitric oxide ($NO_x$) to below 100 mg/$Nm^3$.

In another aspect of the invention, in step (4) of the aforementioned method, both spouting and rotational flow mode are adopted in said gas-solid suspension mixing chamber, which makes flue gases and alkaline materials being sufficiently mixed and reacted.

Accordingly, the invention provided an exhaust gas treatment system for the aforementioned method, which includes: a incinerator 10, a temperature monitoring system 20, a temperature cooling system 30, a dual-purpose reactor 40, a high temperature filter 50, a heat energy recovery and dedusting system 60, an ashes storage bin 70 and an independent stack, wherein said dual-purpose reactor 40 includes a connected incineration chamber 41 and gas-solid suspension chamber 42.

Advantages of this invention are as below:

1, By incinerating compound of alkaline materials and harmful gas under the condition of high temperature provided by dual-purpose reactor of flue ash disposal system in this invention, harmful gases are be disposed at the initial phase of flue ash disposal process and system. So lime spray, which is often used in flue ash disposal, is not needed any more. At the other hand, corrosion to equipment brought by acid gases will be largely decreased because of the treatment of them in the early stage.

2, The utilizable scope of heat energy of flue ashes come out from incineration reactor chamber is high, which is 850~950° C. and the range reaches 120° C. Compared with the existing toxic gases purification system-heat recycle system, it has higher heat energy recovery efficiency.

3, The retention time for toxic gases to be heated to 850~950° C. and then into gas-solid suspend chamber under the condition of high degree of heat insulation would take 6 to 8 seconds. So incineration reaction chamber can completely remove dioxin and hydrocarbon organic, chlorinated organic and chlorinated inorganic, which together can produce dioxin. And this system is greatly better than the existing method.

4, One aspect of the invention, enough urea, ammonia and other deoxidizer will be added into gas-solid suspend chamber of dual purposes reactor, and then the generation of nitric oxide ($NO_x$) will be controlled lower than 100 mg/$Nm^3$.

5, Alkaline material can be recycling in flue ash treatment system, and then the input of alkaline material will be decreased.

The flue ash treatment method and system of the invention can continuous operate and absorb acid gases and eliminate dioxin or dioxin precursor including hydrocarbon organic, chlorinated organic and chlorinated inorganic under a high temperature. The system not only can completely remove toxic organic particles or compounds containing in the flue gases, acid gases including CO, $SO_2$, HCl, HF, dioxin and other noxious substances, but also maintain or increase temperature of the disposed gas and makes it into a table heat source for use. Harmful gas can be changed into resources while toxic gases and acid gases are removed.

DETAIL DESCRIPTION OF THE INVENTION

The method and system with dual-purposes reactor (DPR) have been carried out in small scale trial and middle scale trial in the industry.

The further detail description combined with drawings is provided as below.

Figure 1:
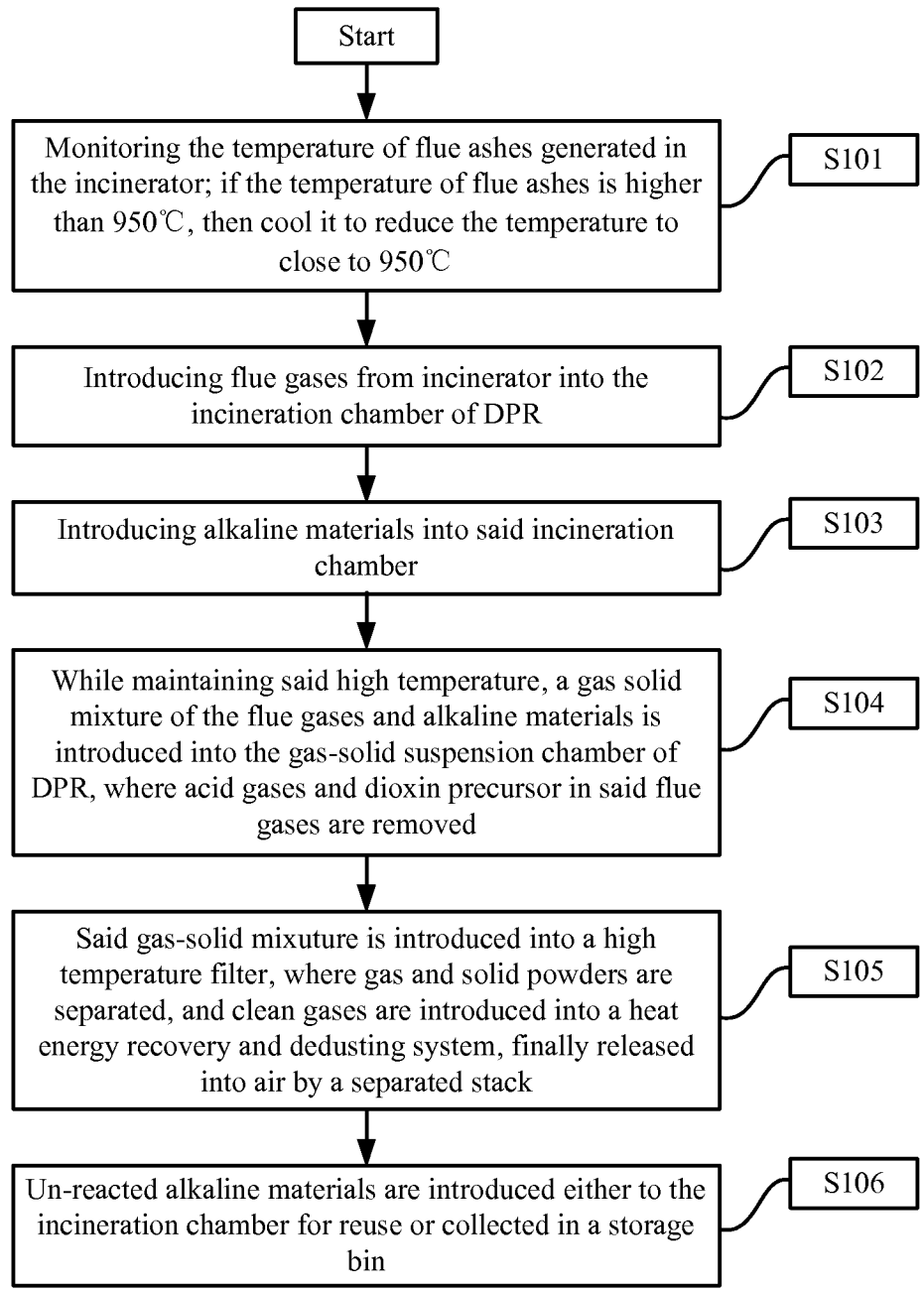
FIG. 1 is the flow chart of an embodiment of this invention, which committed to solve environment pollution from waste incineration process.

Referring to FIG. 1, which is flow chart of an embodiment of the method of this invention, which includes:

As showed in FIG. 1, in S101, temperature of flue gases from an incinerator is monitored in order to prevent the temperature going too high, and especially should prevent it to exceed a high temperature (ranging from 850-950° C.) which would be maintained in the subsequent reactions. Generally speaking, temperature of flue gases from incineration is quite high and could exceed 1200° C. If the temperature is higher than said high temperature, flue ashes should be treated in a cooling system to make it approaching the upper limit of said high temperature.

In S102, transport flue gases with said high temperature into the incineration reaction chamber of a dual-purposes reactor (DPR). If the incineration flue gases belongs to high temperature gases, specialized high-temp flue can be adopted. A flue can be connected with the incineration reactor chamber by hydraulic valve.

If a temperature in incineration reaction chamber is as high as 1400~1600° C. is to be, material for pipe wall of the chamber can be corundum brick contains 90% of $Al_2O_3$. If temperature is between 850~950° C., II-Class high siliceous brick with 60~75% Al2O is sufficient. So incineration reaction chamber of the invention can adopt II-Class high siliceous brick.

In S103, alkaline materials are introduced into said incineration reaction chamber for heating. Said alkali materials are in solid powder form, which is selected from lime, limestone, silica sand, $Al_2O_3$ and clay, or combination thereof. Clay with high volume of silicon is preferred for flue ash disposal. In order to make alkaline material reacting sufficiently in the incineration reaction chamber, nozzle is used to transport alkaline material into the chamber. A combined nozzle is preferred, which will be convenient and terse because, if needed, it can also be used to spray fuel into the chamber.

As flue ash has high temperature, the system needn't additional fuel generally. But under some circumstance of low temperature, additional fuel is still needed to be added into the incineration reaction chamber to keep the temperature in the range of the said high temperature. Under such circumstances, separated fuel adding device such as gas fuel nozzle and fuel oil burner etc can be applied into this system. The said combined nozzle can also be use to create a more compact form. Though this it is not only can reduce the space the system occupied, but also can improve flue ash and high temperature gas flow mixing condition.

The amount of alkaline material used should be 20 to 85 times of molar mass of chemical reaction. As such, the reaction is sufficient enough to eliminate dioxin completely. If the amount of alkaline material is less than 20 times of the molar mass of chemical reaction, the reaction may be not sufficient and the waste gas is not removed completely. If the amount of alkaline material is higher than 85 times of the molar mass of chemical reaction, it will increase the burden of the chamber. In addition, due to the advantage of the method of present invention that the alkaline material can be recycled, even a high amount of alkaline materials is used herein, it would not lead to waste of alkaline materials.

In S104, the gas powder mixture of said flue gases and alkaline materials is entered into the gas-solid compound chamber of the dual-purposes reactor, where the acid gases, organic wastes and dioxin precursors will be eliminated.

The said gas-solid compound chamber adopt a combination of spouting and rotational flow mode, which create alkaline flow in the flue ash so as to achieve the sufficient combination and reaction effect.

If needed, enough reductants such as carbamide and ammonia or combination thereof can be added into the gas-solid compound chamber, which reduce the dosage of $NO_x$ to be less than 100 $mg/Nm^3$.

Steps S102 to S104 should be maintained in a high temperature range of 850-950° C. The preferable high temperature in Step S102 to S104 is 850-920° C., more preferably, 850-900° C.

Another important aspect to achieve sufficient reaction is the duration for treating the flue gases in the connected incineration chamber and gas-solid suspension chamber of the dual-purpose reactor. If the duration is too short, it will lead to insufficiency reaction, while if the duration is too long, resources will be wasted and low efficiency. In this invention, total residence time of said flue gases in the incineration chamber and the gas-solid suspension chamber is 6 to 10 s, preferably 8 to 10 s.

In S105, the said gas-powder mixture is introduced into a high-temp filter and gas and solid powders are separation therein. Gas will enter a heat energy recovery and dedusting system to be treated. After treatment, the gas will turn into harmless gas with a temperature of 120~150° C., which can be released into atmosphere directly, such as through a separated stack besides the heat energy recovery and dedusting system. In the method and system of this invention, separated stack will be used to dispose the gas produced by the method and system of this invention. An separated chimney refers to a stack which is independent to other system or equipment, that to say, this stack is not used to release gas from other utilities or systems.

If the gas is to be used, it's can be introduces into other system instead of being released directly into atmosphere. Flue gas pipeline will be used to conduct heat energy to other system with said energy recovery and dedusting system.

In S106, after the gas-solid separation process through a high temperature filer, the solid residue are the remained unreacted alkaline materials. The solid residue can be introduced into the incineration reaction chamber for circulating reuse, or be collected in an ashes storage bin. The high temperature filer, incineration reaction chamber and the ash storage bin can be connected together through a high temperature three-port valve. After treatment in the high temperature filer, the solid alkaline material can be returned to the incineration reaction chamber directly. Or, if the solid alkaline material was degraded or for other reasons that they are not suitable for reuse in the incineration reaction chamber, the solid alkaline material can be passed into an ash storage bin, or be used in other industrial applications.

Figure 2:
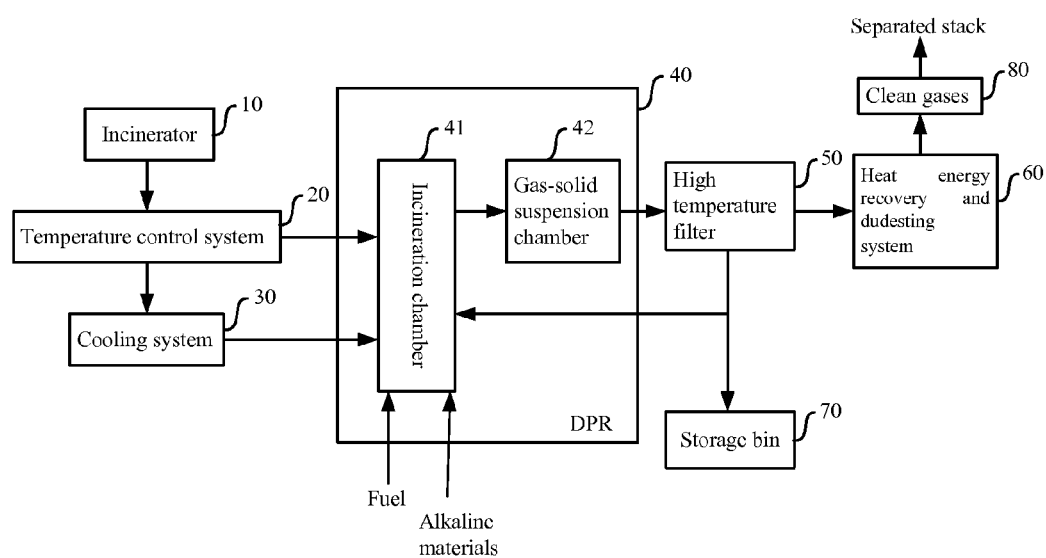
FIG. 2 is the structure diagram of an embodiment of this invention FIG. 1.

FIG. 2 is a structure diagram of embodiment of the invention according to FIG. 1. The exhaust gas treatment system includes:

Incinerator 10, temperature monitoring system 20, temperature cooling system 30, dual-purpose reactor 40, high temperature filter 50, heat energy recovery and dedusting system 60, bottom ash storage bin 70 and specialized stack 80. Said dual-purpose reactor 40 consists of two connected components, which are incineration chamber 41 and gas-solid suspension chamber 42. Following will illustrate each section of the system of the present invention in combination with the method described in FIG. 1.

In the trial of the embodiment of the present invention, under the circumstances that said system operates independently, when flue gases and alkaline materials in solid powder form were fed into incineration chamber 41, temperature in DPR was 850° C. to 950° C., retention time was 6 s to 10 s, oxygen content of the gases at the outlet of DPR was 8% to 11%.

As shown in FIG. 1 and FIG. 2, firstly, the flue gas generated by the waste incineration 10 entered the temperature monitoring system 20, and the temperature of the gas was monitored. In order to remove the acid gases, dioxin and its precursor of the flue gas, and to reduce the cost, the temperature of incineration reaction chamber 41 of dual purpose reactor 40 was maintained between 850~950° C. In case the temperature of the flue gas generated by the waste incineration 10 was higher than 950° C., the flue gases should be introduced into cooling system 30. If the temperature of the flue gas generated by the waste incineration 10 was lower than 950° C., the flue gas could be input to the incineration chamber 41 of dual purpose reactor 40 directly. If the temperature of the flue gas generated by the waste incineration 10 was lower than 850° C., fuel was to be added into the incineration chamber 41 and burn to increase the temperature.

In the system of the embodiment of the invention, II-Class high siliceous brick with 60~75% Al2O was used for incineration reaction chamber.

Flue gases were firstly introduced into the incinerator chamber 41, then adjusted temperature in incinerator chamber 41 to abovementioned temperature, then alkaline materials were input into the incinerator 41 for heating.

Said alkaline materials can be lime, limestone, silica sand, Al2O3, clay or their any combinations.

After incineration process, gas powder mixtures from incinerator chamber 41 were introduced into the gas-solid suspension chamber 42 of DPR 40, where gas and solid sufficiently mixing and reaction, and finally flue gases were cleaned up here.

In the system of the embodiment of the invention, both spouting and rotational flow mode were adopted in sais gas-solid suspension chamber. Temperature in suspension chamber was about 850-950° C., and under such high temperature condition, acid gases, organic materials, dioxin precursor are fully removed, which can stop dioxin reformation in gas cooling process happened later.

After complete reaction, the gas-solid mixture from gas-solid suspension mixing chamber 42 are introduced into a high temperature filter 50. Generally, gas-solid suspension chamber 42 and high temperature filter 50 is connected by a high temperature resistant duct. In said high temperature filter, gas and solid components were separated. After clearance of the solid components, the gas in high temperature was for subsequent usage.

The high temperature gas went though the heat recovery and dedusting system 60 after the gas-solid separation process, and then became non-toxic gas with a temperature between 120~150° C. After the clean-up process, the gas can be discharged into air directly, for example, via a separated stack 80. If the cleaned gas is to be used in other systems, the heat recovery and dedusting system 60 can be connected with other systems through a flue gas pipeline, thus the gas can be re-circled and used.

The residue un-reacted alkaline materials were introduced either back to the incinerator 41 for re-using or to a storage ash bin 70. A high temperature resistant three-port valve is installed to connect said high temperature filter 50, incinerator 41 and storage ash bin 70.

After the gas-solid separation process through a high temperature filer, the remained un-reacted alkaline materials can be introduced into the incineration reaction chamber 41 directly for circulating reuse. If it was found that the solid alkaline materials was degraded and fast change of alkaline materials were required, the remained un-reacted alkaline materials can be introduced into the storage ash bin 70, while the amount of alkaline materials to be added in incinerator chamber 41 should be increased till the ratio of alkaline materials to the flue gases to be treated reached the amount of 20 to 85 times of molar mass of chemical reaction.

Testing results of the pilot using DPR system of the invention mentioned above shown that dioxin content in the released gases after treatment was less than 0.018 ng TEQ/m$^3$c, total volatile organic Carbon was less than 3 mg/m$^3$, FH was less than 3 mg/m$^3$, SO2 is less than 20 mg/m$^3$ (figures are calculated according to 11% dry flue gas in standard condition). From the figures above, it was obvious that each issue can meet China and Europe Union air pollution emission standard.

While the present invention has been described with reference to explanatory embodiments, it is to be understood that the terms used herein are terms of description rather than limitation. Various changes and modifications may be made without departing from the scope and spirit of the present invention as set forth in the specifications.

What is claimed is:

1. A method for treating flue gases generated from waste incinerator by using a dual-purpose reactor, wherein said dual-purpose reactor includes a connected incineration chamber and gas-solid suspension chamber, which includes the following steps:
   (1) Monitoring temperature of flue gases generated from a waste incinerator to keep it at a high temperature, wherein said high temperature is 850~950° C., if the temperature is higher than the upper limitation of said high temperature, then cooling the flue gases and reducing the temperature to close to the upper limitation of said high temperature;
   (2) Introducing said flue gases into the incineration chamber of said dual-purpose reactor;
   (3) Introducing alkaline materials into said incineration chamber;
   (4) Under the condition of maintaining said high temperature, the gas-powder mixture of said flue gases and alkaline materials are introduced into the gas-solid suspension chamber of said dual-purpose reactor, in which the flue gases and alkaline materials are fully mixed and reacted, acid gases and dioxin precursor are removed;
   (5) Said gas powder mixture is introduced into a high temperature filter, where gases and solids are separated from each other, and gases are drawn into a heat energy recycle and dedusting system and then released into the atmosphere by a separated stack;
   (6) Un-reacted alkaline materials are transferred to the incineration chamber for re-usage or collected in an ashes storage bin.

2. A method according to claim 1, wherein in step (1), in case that the temperature of flue gas generated from the incinerator is higher than the upper limitation of said high temperature, temperature reduction measure are taken by means of an automatic cold air valve.

3. A method according to claim 1, wherein said alkaline materials are solid powders selected from lime, limestone, silica, alumina, clay and a mixture thereof.

4. A method according to claim 1, wherein a burner nozzle is installed to the incineration chamber, by which fuel are injected into the incineration chamber and burned to keep the temperature inside the incineration chamber at said high temperature.

5. A method according to claim 1, wherein in step (1) to (4), the gases is maintained in a high temperature, which is 850-920'C.

6. A method according to claim 1, wherein in step (4), both spouting and rotational flow mode are adopted in said gas-solid suspension mixing chamber, which makes flue gases and alkaline materials being sufficiently mixed and reacted.

7. A method according to claim 1, wherein the amount of said alkaline materials is 20 to 85 times of its molar mass of chemical reaction process.

8. A method according to claim 1, wherein the total residence time of said flue gases in the incineration chamber and the gas-solid suspension chamber is 6 to 10 s.

9. A method according to claim 1, wherein in step (4), sufficient reductant selected from carbamide, ammonia and the combination thereof is introduced into the gas-solid suspension chamber to reduce $NO_x$ to below 100 mg/$Nm^3$.

10. An exhaust gas treatment system for the method according to claim 1, which includes: a incinerator, a temperature monitoring system, a temperature cooling system, a dual-purpose reactor, a high temperature filter, a heat energy recovery and dedusting system, an ashes storage bin and an independent stack, wherein said dual-purpose reactor includes a connected incineration chamber 41 and gas-solid suspension chamber.

11. A method according to claim 4, wherein said fuel burner is a combined type, which can be used for injecting fuel or alkaline materials.

12. A method according to claim 5, wherein said high temperature is 860-890° C.

13. A method according to claim 8, wherein the total residence time of said flue gases in the incineration chamber and the gas-solid suspension chamber is 8 to 10 s.

* * * * *